US012145360B2

(12) United States Patent
Linn et al.

(10) Patent No.: US 12,145,360 B2
(45) **Date of Patent: *Nov. 19, 2024**

(54) INTEGRATED CIRCUITS INCLUDING MEMORY CELLS

(71) Applicant: Hewlett-Packard Development Company, L.P., Spring, TX (US)

(72) Inventors: Scott A. Linn, Corvallis, OR (US); James Michael Gardner, Corvallis, OR (US); Michael W. Cumbie, Corvallis, OR (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/393,224

(22) Filed: Dec. 21, 2023

(65) Prior Publication Data

US 2024/0116293 A1 Apr. 11, 2024

Related U.S. Application Data

(63) Continuation of application No. 17/471,844, filed on Sep. 10, 2021, now Pat. No. 11,938,722, which is a continuation of application No. 16/956,316, filed as application No. PCT/US2019/016732 on Feb. 6, 2019, now Pat. No. 11,141,973.

(51) Int. Cl.
*B41J 2/045* (2006.01)

(52) U.S. Cl.
CPC ....... *B41J 2/04536* (2013.01); *B41J 2/04586* (2013.01); *B41J 2/04541* (2013.01)

(58) Field of Classification Search
CPC ............... B41J 2/04536; B41J 2/04541; B41J 2/04581; B41J 2/04586
See application file for complete search history.

(56) References Cited

U.S. PATENT DOCUMENTS

| | | | |
|---|---|---|---|
| 6,161,916 | A | 12/2000 | Gibson et al. |
| 6,685,289 | B2 | 2/2004 | Anderson et al. |
| 6,948,789 | B2 | 9/2005 | Imanaka et al. |
| 7,145,592 | B2 | 12/2006 | Silverbrook et al. |
| 7,448,712 | B2 | 11/2008 | Hatasa et al. |
| 7,802,858 | B2 | 9/2010 | Kasai |
| 8,007,087 | B2 | 8/2011 | Silverbrook et al. |
| 8,070,266 | B2 | 12/2011 | Silverbrook et al. |
| 10,232,615 | B2 | 3/2019 | Giusti et al. |
| 11,141,973 | B2 | 10/2021 | Linn et al. |
| 2002/0126168 | A1 | 9/2002 | Anderson |
| 2002/0140751 | A1 | 10/2002 | Imanaka et al. |
| 2003/0151637 | A1 | 8/2003 | Nakamura et al. |
| 2005/0116983 | A1 | 6/2005 | Wada et al. |

(Continued)

FOREIGN PATENT DOCUMENTS

| | | | |
|---|---|---|---|
| CL | 2008003128 | A1 | 3/2009 |
| CL | 2008003388 | A1 | 3/2009 |

(Continued)

*Primary Examiner* — Thinh H Nguyen
(74) *Attorney, Agent, or Firm* — Foley & Lardner LLP

(57) ABSTRACT

An integrated circuit includes a plurality of memory cells, an address decoder to select memory cells based on a data signal, activation logic to activate selected memory cells based on the data signal and a fire signal, and configuration logic to enable or disable access to the plurality of memory cells.

20 Claims, 9 Drawing Sheets

(56) References Cited

U.S. PATENT DOCUMENTS

| | | | |
|---|---|---|---|
| 2005/0157034 | A1 | 7/2005 | Silverbrook et al. |
| 2006/0197806 | A1* | 9/2006 | Komatsu .............. B41J 2/04541 347/57 |
| 2007/0081842 | A1 | 4/2007 | Ehrhardt, Jr. |
| 2008/0055366 | A1 | 3/2008 | Benjamin et al. |
| 2010/0124329 | A1 | 5/2010 | Lyman |
| 2010/0188448 | A1 | 7/2010 | Kida |
| 2010/0302293 | A1 | 12/2010 | Torgerson et al. |
| 2011/0096930 | A1 | 4/2011 | Walmsley |
| 2014/0320558 | A1 | 10/2014 | Ge et al. |
| 2016/0009080 | A1 | 1/2016 | Akune |
| 2016/0332439 | A1 | 11/2016 | Ge et al. |
| 2016/0339695 | A1 | 11/2016 | Chen et al. |
| 2017/0120590 | A1 | 5/2017 | Chen et al. |
| 2017/0259568 | A1 | 9/2017 | Dodd et al. |
| 2017/0334211 | A1 | 11/2017 | Chen et al. |
| 2018/0050901 | A1 | 2/2018 | Neo et al. |
| 2018/0236445 | A1 | 8/2018 | Giusti et al. |
| 2018/0236762 | A1 | 8/2018 | Negishi et al. |
| 2020/0055309 | A1 | 2/2020 | Martin et al. |
| 2022/0063262 | A1 | 3/2022 | Ng et al. |

FOREIGN PATENT DOCUMENTS

| | | | |
|---|---|---|---|
| CN | 1320521 | A | 11/2001 |
| CN | 101213531 | A | 7/2008 |
| CN | 107073940 | A | 8/2017 |
| EP | 1537996 | A2 | 6/2005 |
| EP | 2613944 | A1 | 7/2013 |
| EP | 3717248 | B1 | 8/2021 |
| JP | 2000-198202 | A | 7/2000 |
| JP | 2001-096869 | A | 4/2001 |
| JP | 2002-086728 | A | 3/2002 |
| JP | 2010-173098 | A | 8/2010 |
| JP | 2020-507496 | A | 3/2020 |
| JP | 2020-508896 | A | 3/2020 |
| WO | 01/25016 | A1 | 4/2001 |
| WO | 01/25017 | A1 | 4/2001 |
| WO | 2012/032127 | A1 | 3/2012 |
| WO | 2018/190863 | A1 | 10/2018 |
| WO | 2019/009903 | A1 | 1/2019 |
| WO | 2019/009904 | A1 | 1/2019 |
| WO | 2019/017867 | A1 | 1/2019 |
| WO | 2020/162916 | A1 | 8/2020 |
| WO | 2020/162919 | A1 | 8/2020 |
| WO | 2020/162920 | A1 | 8/2020 |

* cited by examiner

INTEGRATED CIRCUITS INCLUDING MEMORY CELLS

CROSS-REFERENCE TO RELATED APPLICATIONS

This application is a continuation application of U.S. application Ser. No. 17/471,844, filed Sep. 10, 2021, entitled "INTEGRATED CIRCUITS INCLUDING MEMORY CELLS" which is a continuation application of U.S. application Ser. No. 16/956,316, filed Jun. 19, 2020, entitled "INTEGRATED CIRCUITS INCLUDING MEMORY CELLS" which claims benefit of PCT Application No. PCT/US2019/016732, filed Feb. 6, 2019, entitled "INTEGRATED CIRCUITS INCLUDING MEMORY CELLS".

BACKGROUND

An inkjet printing system, as one example of a fluid ejection system, may include a printhead, an ink supply which supplies liquid ink to the printhead, and an electronic controller which controls the printhead. The printhead, as one example of a fluid ejection device, ejects drops of ink through a plurality of nozzles or orifices and toward a print medium, such as a sheet of paper, so as to print onto the print medium. In some examples, the orifices are arranged in at least one column or array such that properly sequenced ejection of ink from the orifices causes characters or other images to be printed upon the print medium as the printhead and the print medium are moved relative to each other.

DETAILED DESCRIPTION

In the following detailed description, reference is made to the accompanying drawings which form a part hereof, and in which is shown by way of illustration specific examples in which the disclosure may be practiced. It is to be understood that other examples may be utilized and structural or logical changes may be made without departing from the scope of the present disclosure. The following detailed description, therefore, is not to be taken in a limiting sense, and the scope of the present disclosure is defined by the appended claims. It is to be understood that features of the various examples described herein may be combined, in part or whole, with each other, unless specifically noted otherwise.

Fluid ejection dies, such as thermal inkjet (TIJ) dies may be narrow and long pieces of silicon. The silicon area used by a die is related to the cost of the die so that any functionality that can be removed from the die should be removed or modified to have multiple purposes if possible. Non-volatile memory (NVM) may be used on the die to transfer information from the die to a printer, such as thermal behavior, offsets, region information, a color map, the number of nozzles, etc. In addition, NVM may also be used to transfer information from the printer to the die, such as an ink usage gauge, nozzle health information, etc. Memories may be composed of storage elements, read/write multiplexers, and enable/address circuitry. For small memories, the non-storage circuitry may be a large percentage of the overall area used by the memory, making small memories very area inefficient.

Accordingly, disclosed herein are integrated circuits (e.g., fluid ejection dies) including memory cells corresponding to fluid actuation devices. The same circuit logic is used to activate either selected fluid actuation devices or access selected corresponding memory cells based on received addresses and nozzle data. The data stored in each memory cell may be read out of the integrated circuit through a single contact pad. The memory cells may be distributed along the length of the integrated circuit adjacent to the corresponding fluid actuation devices.

As used herein a "logic high" signal is a logic "1" or "on" signal or a signal having a voltage about equal to the logic power supplied to an integrated circuit (e.g., between about 1.8 V and 15 V, such as 5.6 V). As used herein a "logic low" signal is a logic "0" or "off" signal or a signal having a voltage about equal to a logic power ground return for the logic power supplied to the integrated circuit (e.g., about 0 V).

Figure 1A:
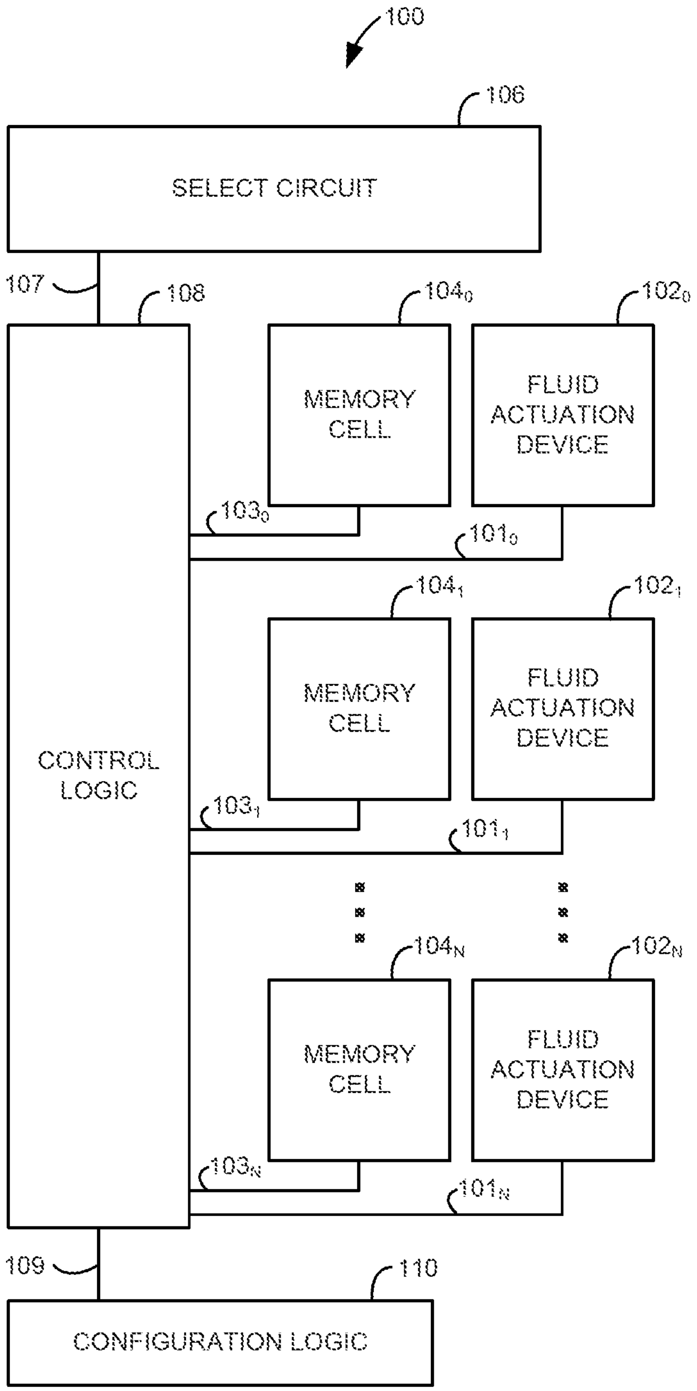
FIG. 1A is a block diagram illustrating one example of an integrated circuit to drive a plurality of fluid actuation devices.

FIG. 1A is a block diagram illustrating one example of an integrated circuit 100 to drive a plurality of fluid actuation devices. Integrated circuit 100 includes a plurality of fluid actuation devices $102_0$ to $102_N$, where "N" is any suitable number of fluid actuation devices. Integrated circuit 100 also includes a plurality of memory cells $104_0$ to $104_N$, a select circuit 106, control logic 108, and configuration logic 110. Each fluid actuation device $102_0$ to $102_N$ is electrically coupled to control logic 108 through a signal path $101_0$ to $101_N$, respectively. Each memory cell $104_0$ to $104_N$ is electrically coupled to control logic 108 through a signal path $103_0$ to $103_N$, respectively. Control logic 108 is electrically coupled to select circuit 106 through a signal path 107 and to configuration logic 110 through a signal path 109.

In one example, each fluid actuation device $102_0$ to $102_N$ includes a nozzle or a fluidic pump to eject fluid drops. Each memory cell $104_0$ to $104_N$ corresponds to a fluid actuation device $102_0$ to $102_N$, respectively. In one example, each memory cell $104_0$ to $104_N$ includes a non-volatile memory cell (e.g., a floating gate transistor, a programmable fuse, etc.). The select circuit 106 selects fluid actuation devices $102_0$ to $102_N$ and memory cells $104_0$ to $104_N$ corresponding to the selected fluid actuation devices $102_0$ to $102_N$. Select circuit 106 may include an address decoder, activation logic, and/or other suitable logic circuitry for selecting fluid actuation devices 102$_0$ to 102$_N$ and corresponding memory cells 104$_0$ to 104$_N$ in response to an address signal and a nozzle data signal. Configuration logic 110 enables or disables access to the plurality of memory cells 104$_0$ to 104$_N$. Configuration logic 110 may include a memory device or other suitable logic circuitry for enabling or disabling access to the plurality of memory cells 104$_0$ to 104$_N$.

Control logic 108 either activates the selected fluid actuation devices 102$_0$ to 102$_N$ or accesses the memory cells 104$_0$ to 104$_N$ corresponding to the selected fluid actuation devices based on a state of the configuration logic 110. Control logic 108 may include a microprocessor, an application-specific integrated circuit (ASIC), or other suitable logic circuitry for controlling the operation of integrated circuit 100. While select circuit 106, control logic 108, and configuration logic 110 are illustrated in separates blocks in FIG. 1A, in other examples, select circuit 106, control logic 108, and/or configuration logic 110 may be combined into a single block or a different number of blocks.

Figure 1B:
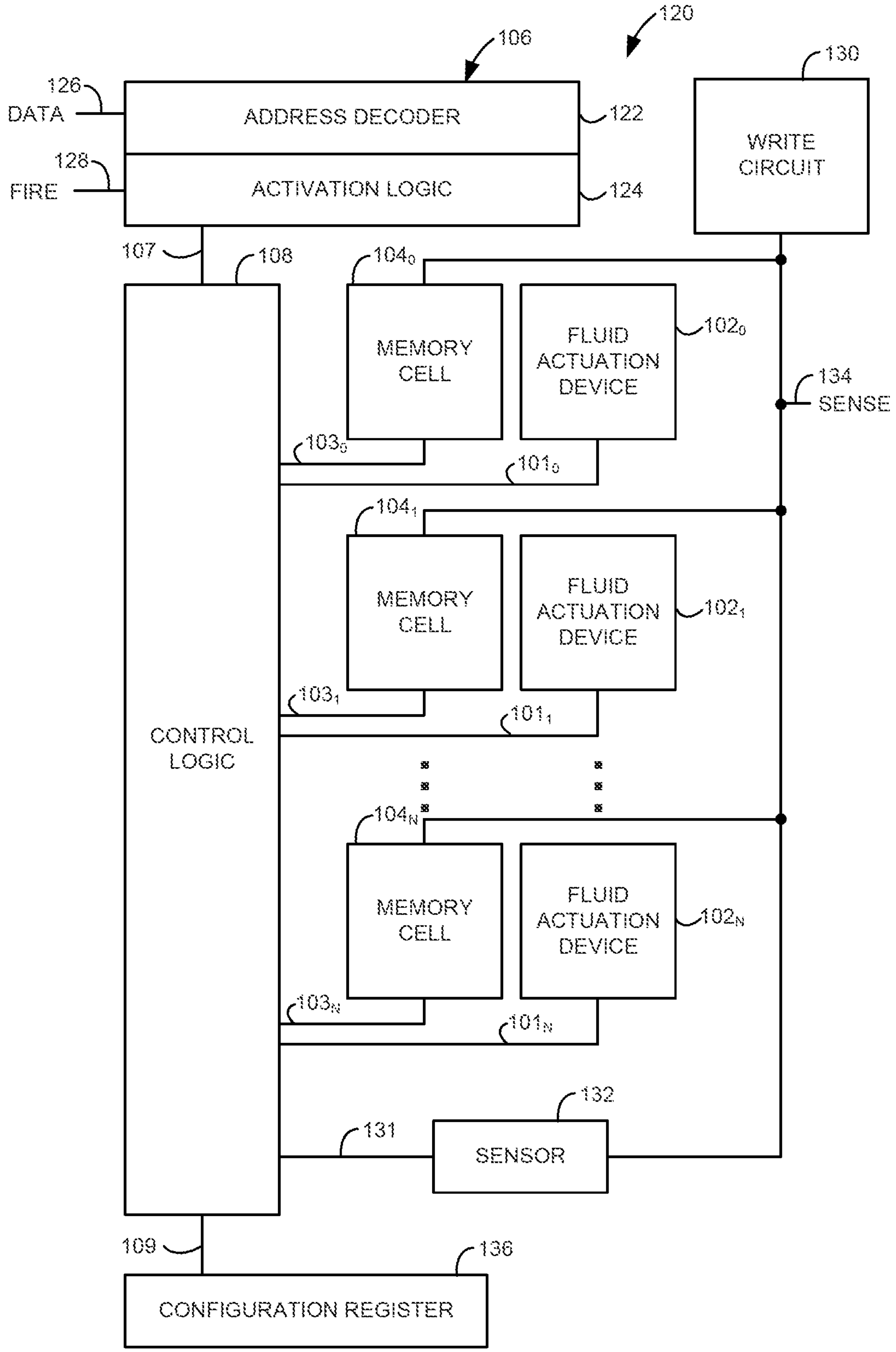
FIG. 1B is a block diagram illustrating another example of an integrated circuit to drive a plurality of fluid actuation devices.

FIG. 1B is a block diagram illustrating another example of an integrated circuit 120 to drive a plurality of fluid actuation devices. Integrated circuit 120 includes a plurality of fluid actuation devices 102$_0$ to 102$_N$, a plurality of memory cells 104$_0$ to 104$_N$, a select circuit 106, and control logic 108. In addition, integrated circuit 120 includes a write circuit 130, a sensor 132, and a configuration register 136. In one example, configuration logic 110 of integrated circuit 100 of FIG. 1A includes configuration register 136.

In this example, select circuit 106 includes an address decoder 122 and activation logic 124. Address decoder 122 receive addresses and data through a data interface 126. Address decoder 122 is electrically coupled to activation logic 124. Activation logic 124 receives a fire signal through a fire interface 128. Each memory cell 104$_0$ to 104$_N$ is electrically coupled to write circuit 130 through a sense interface 134. Sensor 132 is electrically coupled to control logic 108 through a signal path 131 and to sense interface 134.

Address decoder 122 selects fluid actuation devices 102$_0$ to 102$_N$ and memory cells 104$_0$ to 104$_N$ corresponding to the selected fluid actuation devices 102$_0$ to 102$_N$ in response to an address. The address may be received through data interface 126. The activation logic 124 activates selected fluid actuation devices 102$_0$ to 102$_N$ and memory cells 104$_0$ to 104$_N$ corresponding to the selected fluid actuation devices 102$_0$ to 102$_N$ based on a data signal and a fire signal. The data signal may include nozzle data indicating which fluid actuation device(s) for the provided address are to be selected. The data signal may be received through the data interface 126. The fire signal indicates when the selected fluid actuation devices are to be activated (i.e., fired) or when the corresponding memory cells are to be accessed. The fire signal may be received through the fire interface 128. Each of the data interface 126, fire interface 128, and sense interface 134 may be a contact pad, a pin, a bump, a wire, or another suitable electrical interface for transmitting signals to and/or from integrated circuit 120. Each of the interfaces 126, 128, and 134 may be electrically coupled to a fluid ejection system (e.g., a host print apparatus such as fluid ejection system 500, which will be described below with reference to FIG. 7).

The configuration register 136 stores data to enable or disable access to the plurality of memory cells 104$_0$ to 104$_N$. The control logic 108 either activates the selected fluid actuation devices 102$_0$ to 102$_N$ or accesses the memory cells 104$_0$ to 104$_N$ corresponding to the selected fluid actuation devices 102$_0$ to 102$_N$ based on the data stored in the configuration register 136. In one example, the configuration register 136 also stores data to enable write access or read access to the plurality of memory cells 104$_0$ to 104$_N$. In another example, the configuration register 136 also stores data to enable or disable the sensor 132.

Configuration register 136 may be a memory device (e.g., non-volatile memory, shift register, etc.) and may include any suitable number of bits (e.g., 4 bits to 24 bits, such as 12 bits). In certain examples, configuration register 136 may also store configuration data for testing integrated circuit 120, detecting cracks within a substrate of integrated circuit 120, enabling timers of integrated circuit 120, setting analog delays of integrated circuit 120, validating operations of integrated circuit 120, or for configuring other functions of integrated circuit 120.

Data stored in memory cells 104$_0$ to 104$_N$ may be read through sense interface 134 when the selected memory cells 104$_0$ to 104$_N$ have been accessed by control logic 108. In addition, write circuit 130 may write data to selected memory cells when the selected memory cells 104$_0$ to 104$_N$ have been accessed by control logic 108. Sensor 132 may be a junction device (e.g., thermal diode), a resistive device (e.g., crack detector), or another suitable device for sensing a state of integrated circuit 120. Sensor 132 may be read through sense interface 134.

Figure 2:
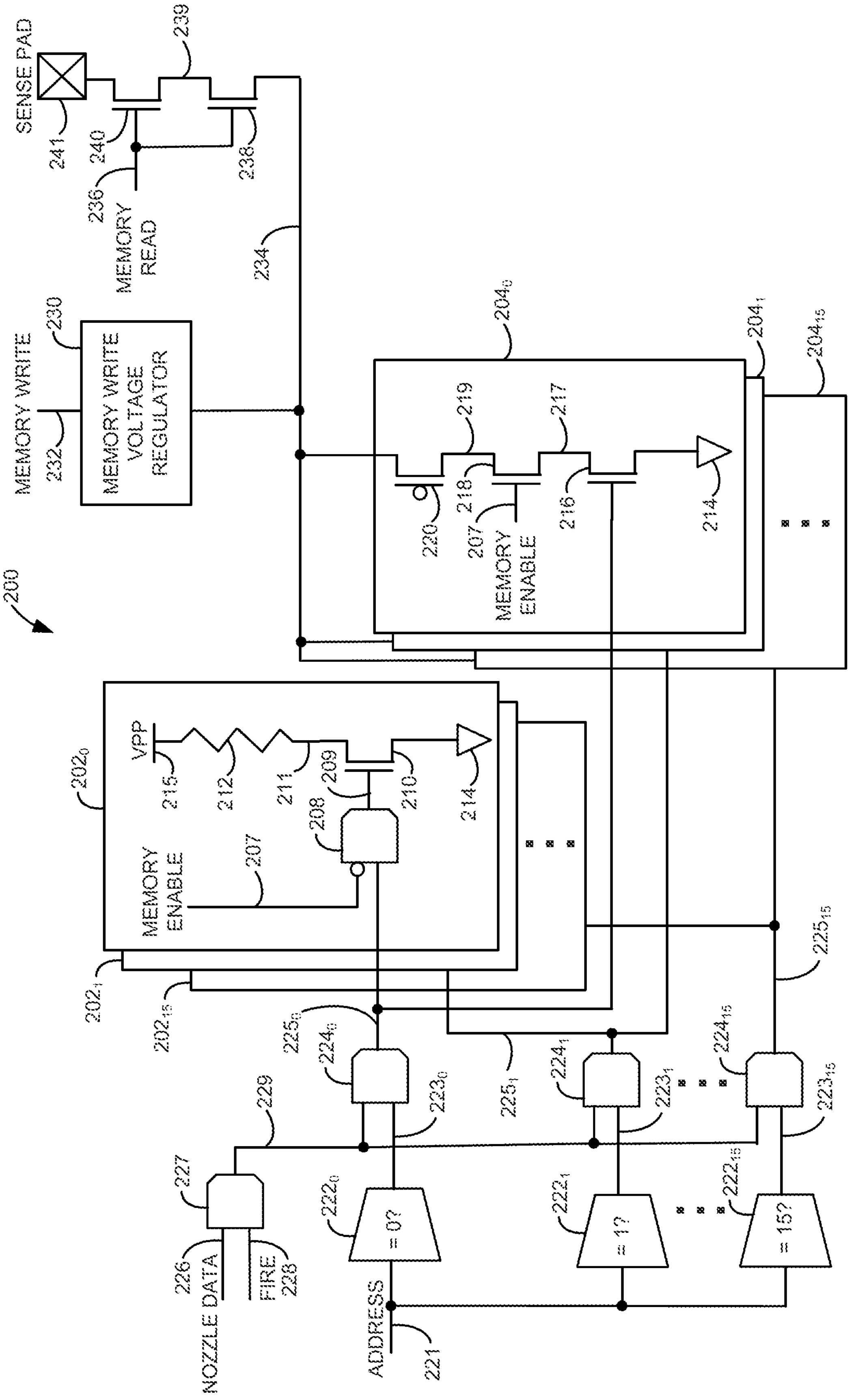
FIG. 2 is a schematic diagram illustrating one example of a circuit to drive a plurality of fluid actuation devices or access corresponding memory cells.

FIG. 2 is a schematic diagram illustrating one example of a circuit 200 to drive a plurality of fluid actuation devices or access corresponding memory cells. In one example, circuit 200 is part of integrated circuit 100 of FIG. 1A or integrated circuit 120 of FIG. 1B. Circuit 200 illustrates one group of 16 fluid actuation devices and a corresponding group of 16 memory cells. An integrated circuit, such as integrated circuit 100 of FIG. 1A or integrated circuit 120 of FIG. 1B may include any suitable number of groups of fluid actuation devices and corresponding memory cells. While a group of 16 actuation devices and corresponding memory cells is illustrated in FIG. 2, in other examples the number of fluid actuation devices and corresponding memory cells within each group may vary.

Circuit 200 includes a plurality of fluid actuation devices 202$_0$ to 202$_{15}$, a plurality of memory cells 204$_0$ to 204$_{15}$, an address decoder including logic gates 222$_0$ to 222$_{15}$, activation logic including logic gates 227 and 224$_0$ to 224$_{15}$, a write circuit including a memory write voltage regulator 230, transistors 238 and 240, and a contact (i.e., sense) pad 241. A first input of logic gate 227 receives nozzle data through a nozzle data signal path 226. A second input of logic gate 227 receives a fire signal through a fire signal path 228. The output of logic gate 227 is electrically coupled to a first input of each logic gate 224$_0$ to 224$_{15}$ through a signal path 229. The input of each logic gate 222$_0$ to 222$_{15}$ receives an address signal through an address signal path 221. The output of each logic gate 222$_0$ to 222$_{15}$ is electrically coupled to a second input of each logic gate 224$_0$ to 224$_{15}$ through a signal path 223$_0$ to 223$_{15}$, respectively. The output of each logic gate 224$_0$ to 224$_{15}$ is electrically coupled to a fluid actuation device 202$_0$ to 202$_{15}$ and to a memory cell 204$_0$ to 204$_{15}$ through a signal path 225$_0$ to 225$_{15}$, respectively.

Each fluid actuation device 202$_0$ to 202$_{15}$ includes a logic gate 208, a transistor 210, and a firing resistor 212. While fluid actuation device 202$_0$ is illustrated and described herein, the other fluid actuation devices 202$_1$ to 202$_{15}$ include a similar circuit. A first input of the logic gate 208 is electrically coupled to signal path 225$_0$. A second input (inverting) of the logic gate 208 receives a memory enable signal through a memory enable signal path 207. The output of logic gate 208 is electrically coupled to the gate of transistor 210 through a signal path 209. One side of the source-drain path of transistor 210 is electrically coupled to a common or ground node 214. The other side of the source-drain path of transistor 210 is electrically coupled to one side of firing resistor 212 through a signal path 211. The other side of firing resistor 212 is electrically coupled to a supply voltage node (e.g., VPP) 215.

Each memory cell $\mathbf{204}_0$ to $\mathbf{204}_{15}$ includes transistors 216 and 218 and a floating gate transistor 220. While memory cell $\mathbf{204}_0$ is illustrated and described herein, the other memory cells 2041 to $\mathbf{204}_{15}$ include a similar circuit. The gate of transistor 216 is electrically coupled to signal path $\mathbf{225}_0$. One side of the source-drain path of transistor 216 is electrically coupled to a common or ground node 214. The other side of the source-drain path of transistor 216 is electrically coupled to one side of the source-drain path of transistor 218 through a signal path 217. The gate of transistor 218 receives a memory enable signal through a memory enable signal path 207. The other side of the source-drain path of transistor 218 is electrically coupled to one side of the source-drain path of floating gate transistor 220 through a signal path 219. The other side of the source-drain path of floating gate transistor 220 is electrically coupled to memory write voltage regulator 230 and one side of the source-drain path of transistor 238 through a signal path 234.

Memory write voltage regulator 230 receives a memory write signal through a memory write signal path 232. The gate of transistor 238 and the gate of transistor 240 receive a memory read signal through a memory read signal path 236. The other side of the source-drain path of transistor 238 is electrically coupled to one side of the source-drain path of transistor 240 through a signal path 239. The other side of the source-drain path of transistor 240 is electrically coupled to sense pad 241.

The nozzle data signal on nozzle data signal path 226, the fire signal on fire signal path 228, and the address signal on address signal path 221 are used to activate a fluid actuation device $\mathbf{202}_0$ to $\mathbf{202}_{15}$ or a corresponding memory cell $\mathbf{204}_0$ to $\mathbf{204}_{15}$. The memory enable signal on memory enable signal path 207 determines whether a fluid actuation device $\mathbf{202}_0$ to $\mathbf{202}_{15}$ is activated or whether a corresponding memory cell $\mathbf{204}_0$ to $\mathbf{204}_{15}$ is accessed. In response to a logic high memory enable signal, transistor 218 is turned on to enable access to memory cells $\mathbf{204}_0$ to $\mathbf{204}_{15}$. In addition, in response to a logic high memory enable signal, logic gate 208 outputs a logic low signal to turn off transistor 210 to prevent any fluid actuation devices $\mathbf{202}_0$ to $\mathbf{202}_{15}$ from firing in response to a fire signal passed to signal paths $\mathbf{225}_0$ to $\mathbf{225}_{15}$. In response to a logic low memory enable signal, transistor 218 turns off to disable access to memory cells $\mathbf{204}_0$ to $\mathbf{204}_{15}$. In addition, in response to a logic low memory enable signal, logic gate 208 allows fire signals passed to signal paths $\mathbf{225}_0$ to $\mathbf{225}_{15}$ to fire fluid actuation devices $\mathbf{202}_0$ to $\mathbf{202}_{15}$. In one example, the memory enable signal is based on a data bit stored in a configuration register, such as configuration register 136 of FIG. 1B. In another example, the memory enable signal is based on a data bit received by circuit 200 along with the address and nozzle data, which is used by configuration logic, such as configuration logic 110 of FIG. 1A, to enable or disable the memory cells $\mathbf{204}_0$ to $\mathbf{204}_{15}$.

The nozzle data signal indicates whether fluid actuation devices $\mathbf{202}_0$ to $\mathbf{202}_{15}$ or corresponding memory cells $\mathbf{204}_0$ to $\mathbf{204}_{15}$ will be selected. In one example, the nozzle data signal includes a logic high signal to select fluid actuation devices $\mathbf{202}_0$ to $\mathbf{202}_{15}$ or corresponding memory cells $\mathbf{204}_0$ to $\mathbf{204}_{15}$ and a logic low signal to deselect fluid actuation devices $\mathbf{202}_0$ to $\mathbf{202}_{15}$ or corresponding memory cells $\mathbf{204}_0$ to $\mathbf{204}_{15}$. In response to a logic high nozzle data signal, logic gate 227 passes a logic high signal to signal path 229 in response to a logic high fire signal. In response to a logic low nozzle data signal or a logic low fire signal, logic gate 227 passes a logic low signal to signal path 229.

The address signal selects one of the fluid actuation devices $\mathbf{202}_0$ to $\mathbf{202}_{15}$ or corresponding memory cells $\mathbf{204}_0$ to $\mathbf{204}_{15}$. In response to the address signal, one of the logic gates $\mathbf{222}_0$ to $\mathbf{222}_{15}$ passes a logic high signal to a corresponding signal path $\mathbf{223}_0$ to $\mathbf{223}_{15}$. The other logic gates $\mathbf{222}_0$ to $\mathbf{222}_{15}$ pass a logic low signal to the corresponding signal paths $\mathbf{223}_0$ to $\mathbf{223}_{15}$.

Each logic gate $\mathbf{224}_0$ to $\mathbf{224}_{15}$ passes a logic high signal to the corresponding signal path $\mathbf{225}_0$ to $\mathbf{225}_{15}$ in response to a logic high signal on signal path 229 and a logic high signal on the corresponding signal path $\mathbf{223}_0$ to $\mathbf{223}_{15}$. Each logic gate $\mathbf{224}_0$ to $\mathbf{224}_{15}$ passes a logic low signal to the corresponding signal path $\mathbf{225}_0$ to $\mathbf{225}_{15}$ in response to a logic low signal on signal path 229 or a logic low signal on the corresponding signal path $\mathbf{223}_0$ to $\mathbf{223}_{15}$. Accordingly, in response to a logic low memory enable signal and a logic high signal on a signal path $\mathbf{225}_0$ to $\mathbf{225}_{15}$, the corresponding fluid actuation device $\mathbf{202}_0$ to $\mathbf{202}_{15}$ fires by activating the corresponding firing resistor 212. In response to a logic high memory enable signal and a logic high signal on a signal path $\mathbf{225}_0$ to $\mathbf{225}_{15}$, the corresponding memory cell $\mathbf{204}_0$ to $\mathbf{204}_{15}$ is selected for access.

With a memory cell $\mathbf{204}_0$ to $\mathbf{204}_{15}$ selected for access, memory write voltage regulator 230 may be enabled by a memory write signal on memory write signal path 232 to apply a voltage to signal path 234 to write a data bit to floating gate transistor 220. In addition, with a memory cell $\mathbf{204}_0$ to $\mathbf{204}_{15}$ selected for access, transistors 238 and 240 may be turned on in response to a memory read signal on memory read signal path 236. With transistors 238 and 240 turned on, the data bit stored in floating gate transistor 220 may be read through sense pad 241 (e.g., by a host print apparatus coupled to sense pad 241). In one example, the memory write signal and the memory read signal are based on data stored in a configuration register, such as configuration register 136 of FIG. 1B. In another example, the memory write signal and the memory read signal are based on data received by circuit 200 along with the address and nozzle data, which is used by configuration logic, such as configuration logic 110 of FIG. 1A, to activate the read signal or the write signal.

Figure 3A:
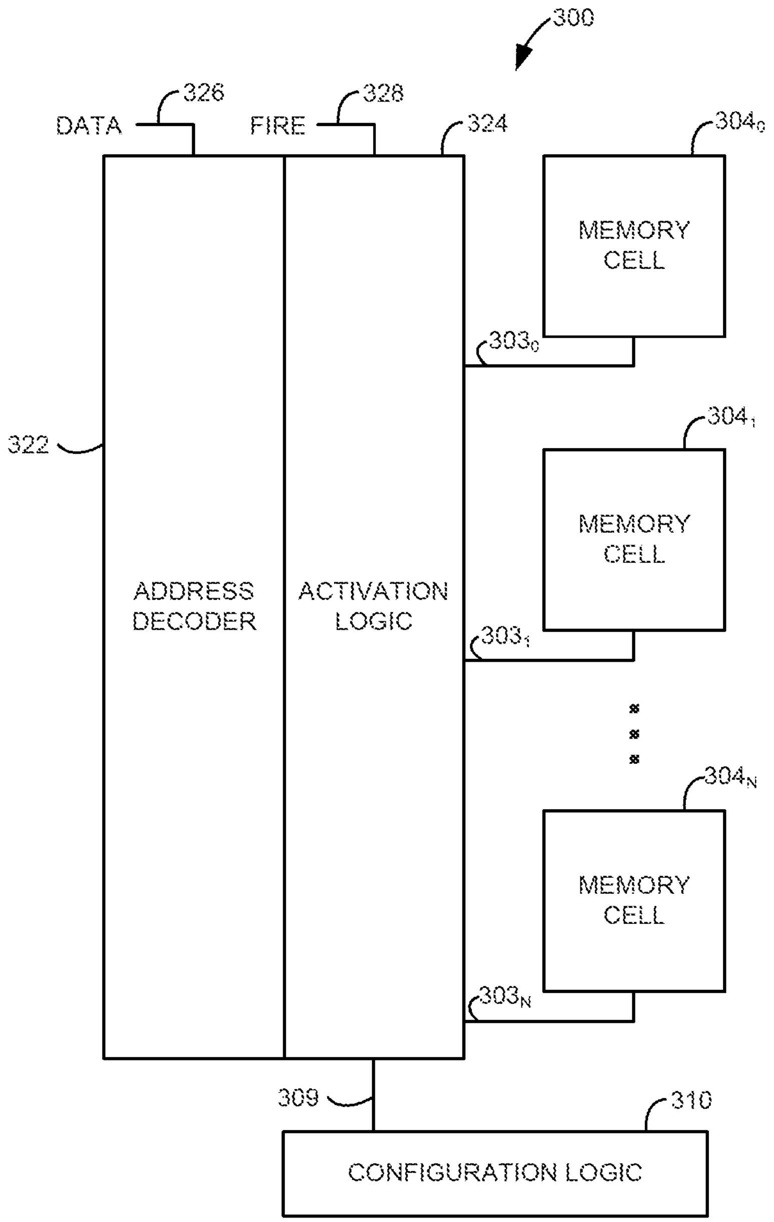
FIG. 3A is a block diagram illustrating one example of an integrated circuit to access a memory associated with a fluid ejection device.

FIG. 3A is a block diagram illustrating one example of an integrated circuit 300 to access a memory associated with a fluid ejection device. In this example, the fluid actuation devices may be located on an integrated circuit separate from the memory. Integrated circuit 300 includes a plurality of memory cells $\mathbf{304}_0$ to $\mathbf{304}_N$, an address decoder 322, activation logic 324, and configuration logic 310. Each memory cell $\mathbf{304}_0$ to $\mathbf{304}_N$ is electrically coupled to activation logic 324 through a signal path $\mathbf{303}_0$ to $\mathbf{303}_N$, respectively. Activation logic 324 is electrically coupled to address decoder 322, to configuration logic 310 through a signal path 309, and receives a fire signal through a fire interface 328. Address decoder 322 receives a data signal through a data interface 326. Each of the data interface 326 and the fire interface 328 may be a contact pad, a pin, a bump, a wire, or another suitable electrical interface for transmitting signals to and/or from integrated circuit 300. Each of the interfaces 326 and 328 may be electrically coupled to a fluid ejection system (e.g., a host print apparatus).

In one example, each memory cell $304_0$ to $304_N$ includes a non-volatile memory cell (e.g., a floating gate transistor, a programmable fuse, etc.). Address decoder 322 selects memory cells $304_0$ to $304_N$ in response to an address, which may be received through data interface 326. Activation logic 324 activates selected memory cells $304_0$ to $304_N$ based on a data signal on data interface 326 and a fire signal on fire interface 328. Configuration logic 310 enables or disables access to the plurality of memory cells $304_0$ to $304_N$.

Figure 3B:
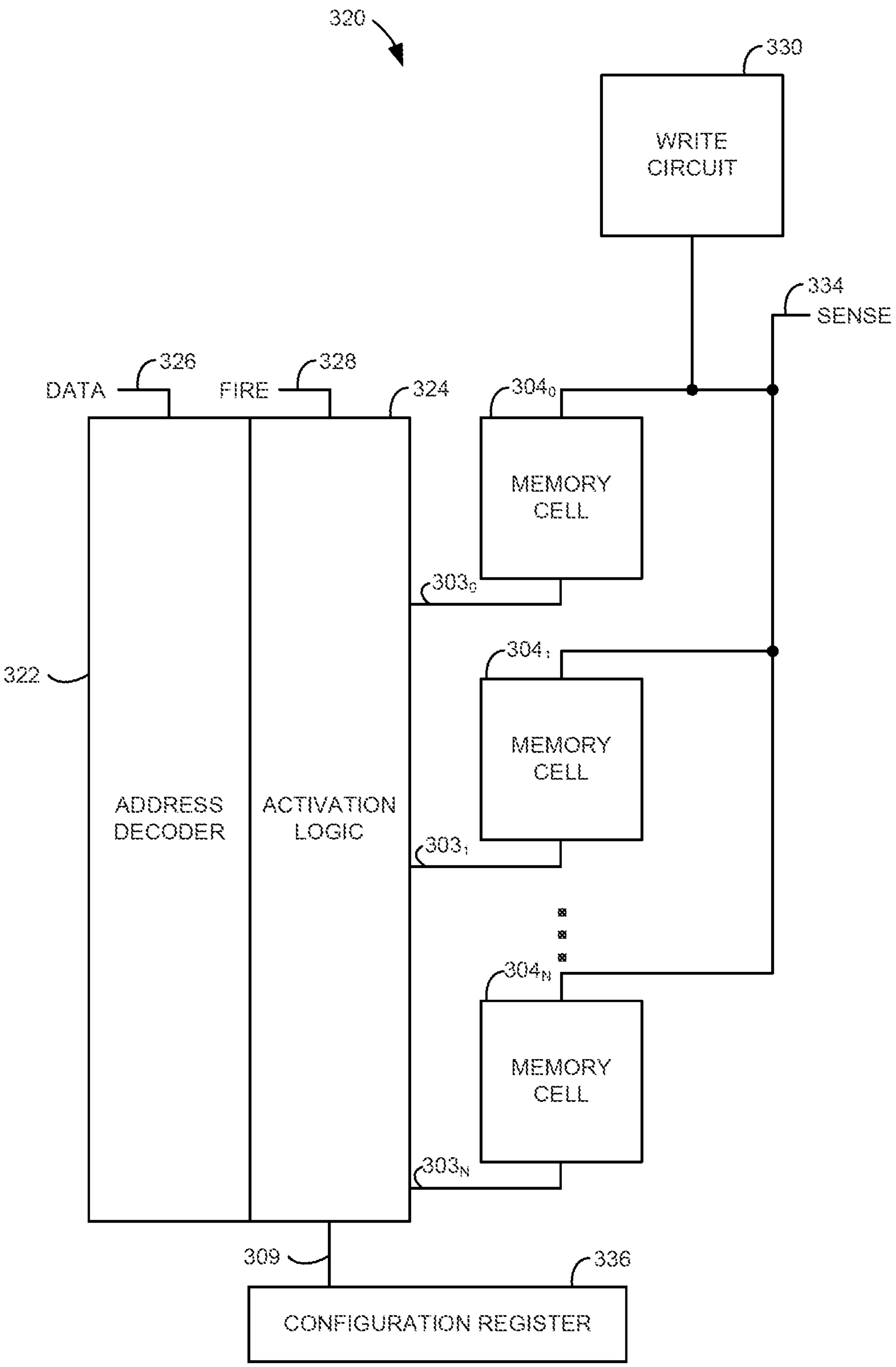
FIG. 3B is a block diagram illustrating another example of an integrated circuit to access a memory associated with a fluid ejection device.

FIG. 3B is a block diagram illustrating another example of an integrated circuit 320 to access a memory associated with a fluid ejection device. Integrated circuit 320 includes a plurality of memory cells $304_0$ to $304_N$, an address decoder 322, and activation logic 324. In addition, integrated circuit 320 includes a write circuit 330 and a configuration register 336. In one example, configuration logic 310 of integrated circuit 300 of FIG. 3A includes configuration register 336. Each memory cell $304_0$ to $304_N$ is electrically coupled to write circuit 330 through a sense interface 334.

Configuration register 336 may store data to enable or disable access to the plurality of memory cells $304_0$ to $304_N$. In addition, configuration register 336 may store data to enable write access or read access to the plurality of memory cells $304_0$ to $304_N$. Sense interface 334 provides a single interface coupled to each of the plurality of memory cells $304_0$ to $304_N$ to connect to a single contact of a host print apparatus. In one example, sense interface 334 includes a single contact pad.

Data stored in memory cells $304_0$ to $304_N$ may be read through sense interface 334 when the selected memory cells $304_0$ to $304_N$ have been accessed by address decoder 322 and activation logic 324. In addition, write circuit 330 may write data to selected memory cells $304_0$ to $304_N$ when the selected memory cells $304_0$ to $304_N$ have been accessed by address decoder 322 and activation logic 324.

Figure 4A:
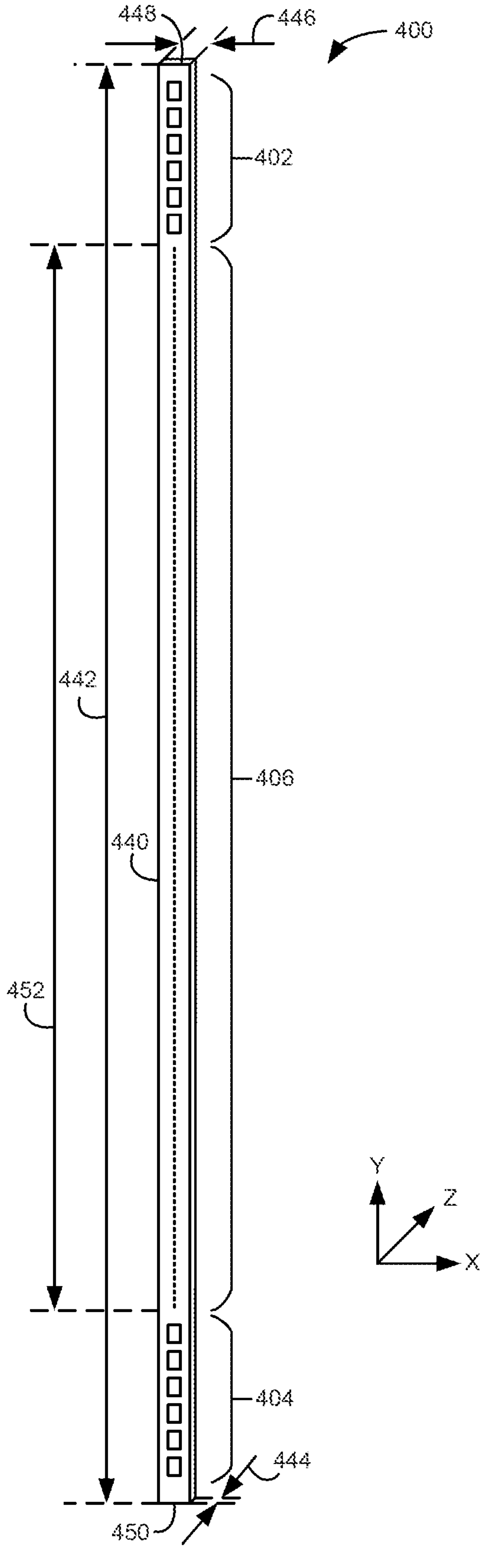
FIGS. 4A and 4B illustrate one example of a fluid ejection die.
Figure 4B:
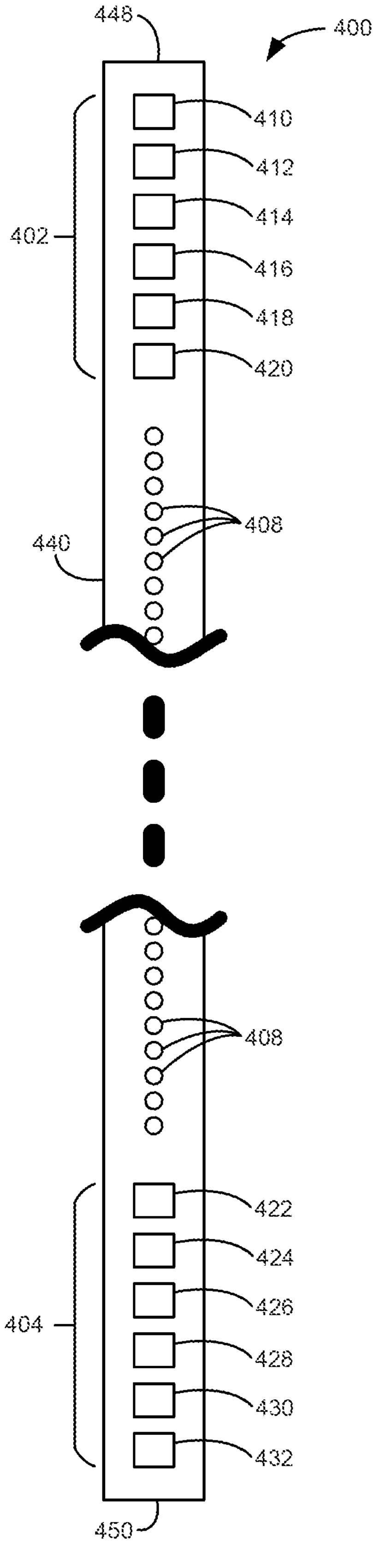

FIG. 4A illustrates one example of a fluid ejection die 400 and FIG. 4B illustrates an enlarged view of the ends of fluid ejection die 400. In one example, fluid ejection die 400 includes integrated circuit 100 of FIG. 1A, integrated circuit 120 of FIG. 1B, or circuit 200 of FIG. 2. Die 400 includes a first column 402 of contact pads, a second column 404 of contact pads, and a column 406 of fluid actuation devices 408. The second column 404 of contact pads is aligned with the first column 402 of contact pads and at a distance (i.e., along the Y axis) from the first column 402 of contact pads. The column 406 of fluid actuation devices 408 is disposed longitudinally to the first column 402 of contact pads and the second column 404 of contact pads. The column 406 of fluid actuation devices 408 is also arranged between the first column 402 of contact pads and the second column 404 of contact pads. In one example, fluid actuation devices 408 are nozzles or fluidic pumps to eject fluid drops.

In one example, the first column 402 of contact pads includes six contact pads. The first column 402 of contact pads may include the following contact pads in order: a data contact pad 410, a clock contact pad 412, a logic power ground return contact pad 414, a multipurpose input/output (i.e., sense) contact pad 416, a first high voltage power supply contact pad 418, and a first high voltage power ground return contact pad 420. Therefore, the first column 402 of contact pads includes the data contact pad 410 at the top of the first column 402, the first high voltage power ground return contact pad 420 at the bottom of the first column 402, and the first high voltage power supply contact pad 418 directly above the first high voltage power ground return contact pad 420. While contact pads 410, 412, 414, 416, 418, and 420 are illustrated in a particular order, in other examples the contact pads may be arranged in a different order.

In one example, the second column 404 of contact pads includes six contact pads. The second column 404 of contact pads may include the following contact pads in order: a second high voltage power ground return contact pad 422, a second high voltage power supply contact pad 424, a logic reset contact pad 426, a logic power supply contact pad 428, a mode contact pad 430, and a fire contact pad 432. Therefore, the second column 404 of contact pads includes the second high voltage power ground return contact pad 422 at the top of the second column 404, the second high voltage power supply contact pad 424 directly below the second high voltage power ground return contact pad 422, and the fire contact pad 432 at the bottom of the second column 404. While contact pads 422, 424, 426, 428, 430, and 432 are illustrated in a particular order, in other examples the contact pads may be arranged in a different order.

Data contact pad 410 (e.g. data interface 126 of FIG. 1B) may be used to input serial data to die 400 for selecting fluid actuation devices (e.g., via select circuit 106 of FIG. 1B), memory bits (e.g., via select circuit 106 of FIG. 1B), thermal sensors, configuration modes (e.g. via configuration register 136 of FIG. 1B), etc. Data contact pad 410 may also be used to output serial data from die 400 for reading memory bits, configuration modes, status information, etc. Clock contact pad 412 may be used to input a clock signal to die 400 to shift serial data on data contact pad 410 into the die or to shift serial data out of the die to data contact pad 410. Logic power ground return contact pad 414 provides a ground return path for logic power (e.g., about 0 V) supplied to die 400. In one example, logic power ground return contact pad 414 is electrically coupled to the semiconductor (e.g., silicon) substrate 440 of die 400. Multipurpose input/output contact pad 416 (e.g., sense interface 134 of FIG. 1B or sense pad 241 of FIG. 2) may be used for analog sensing and/or digital test modes of die 400. In one example, multipurpose input/output contact pad 416 may be electrically coupled to each memory cell $104_0$ to $104_N$, write circuit 130, and sensor 132 of FIG. 1B.

First high voltage power supply contact pad 418 and second high voltage power supply contact pad 424 may be used to supply high voltage (e.g., about 32 V) to die 400. First high voltage power ground return contact pad 420 and second high voltage power ground return contact pad 422 may be used to provide a power ground return (e.g., about 0 V) for the high voltage power supply. The high voltage power ground return contact pads 420 and 422 are not directly electrically connected to the semiconductor substrate 440 of die 400. The specific contact pad order with the high voltage power supply contact pads 418 and 424 and the high voltage power ground return contact pads 420 and 422 as the innermost contact pads may improve power delivery to die 400. Having the high voltage power ground return contact pads 420 and 422 at the bottom of the first column 402 and at the top of the second column 404, respectively, may improve reliability for manufacturing and may improve ink shorts protection.

Logic reset contact pad 426 may be used as a logic reset input to control the operating state of die 400. Logic power supply contact pad 428 may be used to supply logic power (e.g., between about 1.8 V and 15 V, such as 5.6 V) to die 400. Mode contact pad 430 may be used as a logic input to control access to enable/disable configuration modes (i.e., functional modes) of die 400. Fire contact pad 432 (e.g., fire interface 128 of FIG. 1B) may be used as a logic input to latch loaded data from data contact pad 410 and to enable fluid actuation devices or memory elements of die 400.

Die 400 includes an elongate substrate 440 having a length 442 (along the Y axis), a thickness 444 (along the Z axis), and a width 446 (along the X axis). In one example, the length 442 is at least twenty times the width 446. The width 446 may be 1 mm or less and the thickness 444 may be less than 500 microns. The fluid actuation devices 408 (e.g., fluid actuation logic) and contact pads 410-432 are provided on the elongate substrate 440 and are arranged along the length 442 of the elongate substrate. Fluid actuation devices 408 have a swath length 452 less than the length 442 of the elongate substrate 440. In one example, the swath length 452 is at least 1.2 cm. The contact pads 410-432 may be electrically coupled to the fluid actuation logic. The first column 402 of contact pads may be arranged near a first longitudinal end 448 of the elongate substrate 440. The second column 404 of contact pads may be arranged near a second longitudinal end 450 of the elongate substrate 440 opposite to the first longitudinal end 448.

Figure 5A:
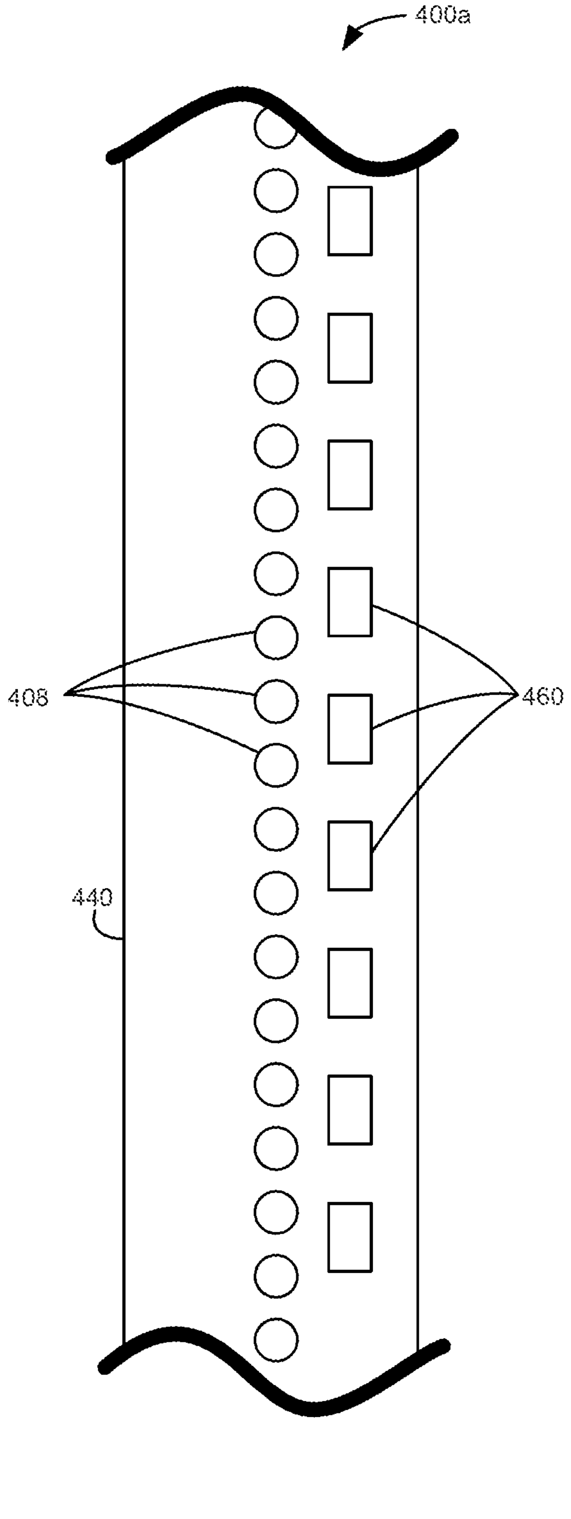
FIG. 5A illustrates an enlarged view of one example of a portion of a fluid ejection die.
Figure 5B:
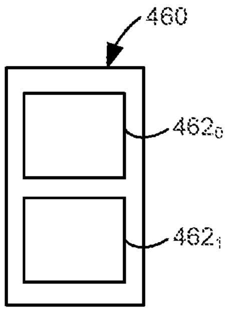
FIG. 5B is a block diagram illustrating one example of a group of memory cells of the fluid ejection die of FIG. 5A.

FIG. 5A illustrates an enlarged view of a central portion of a fluid ejection die 400*a*, as a further example of the fluid ejection die 400 of FIGS. 4A and 4B. As previously described with reference to FIGS. 4A and 4B, fluid ejection die 400*a* includes a plurality of nozzles 408 arranged in a column along the length of the elongate substrate 440. In addition, fluid ejection die 400 includes a plurality of memory cells arranged in groups 460 adjacent to the plurality of nozzles 408. As illustrated in FIG. 5B, each group 460 of memory cells may include a first memory cell $\mathbf{462}_0$ and a second memory cell $\mathbf{462}_1$. Each memory cell 462 corresponds to a nozzle 408. As previously described, fluid actuation logic of fluid ejection die 400 either ejects fluid from selected nozzles 408 or accesses memory cells 462 corresponding to the selected nozzles 408.

In one example, each nozzle 408 of the plurality of nozzles has a corresponding memory cell 462. In another example, every other nozzle 408 of the plurality of nozzles has a corresponding memory cell 462. In another example, the plurality of memory cells may include a single memory cell 462 corresponding to each nozzle 408. In another example, the plurality of memory cells includes at least two memory cells 462 corresponding to each nozzle 408. The plurality of memory cells 462 may be arranged in a plurality of groups 460, where each group 460 includes at least two memory cells 462. The plurality of groups 460 are spaced apart from each other along the length of the elongate substrate 440.

Figure 6A:
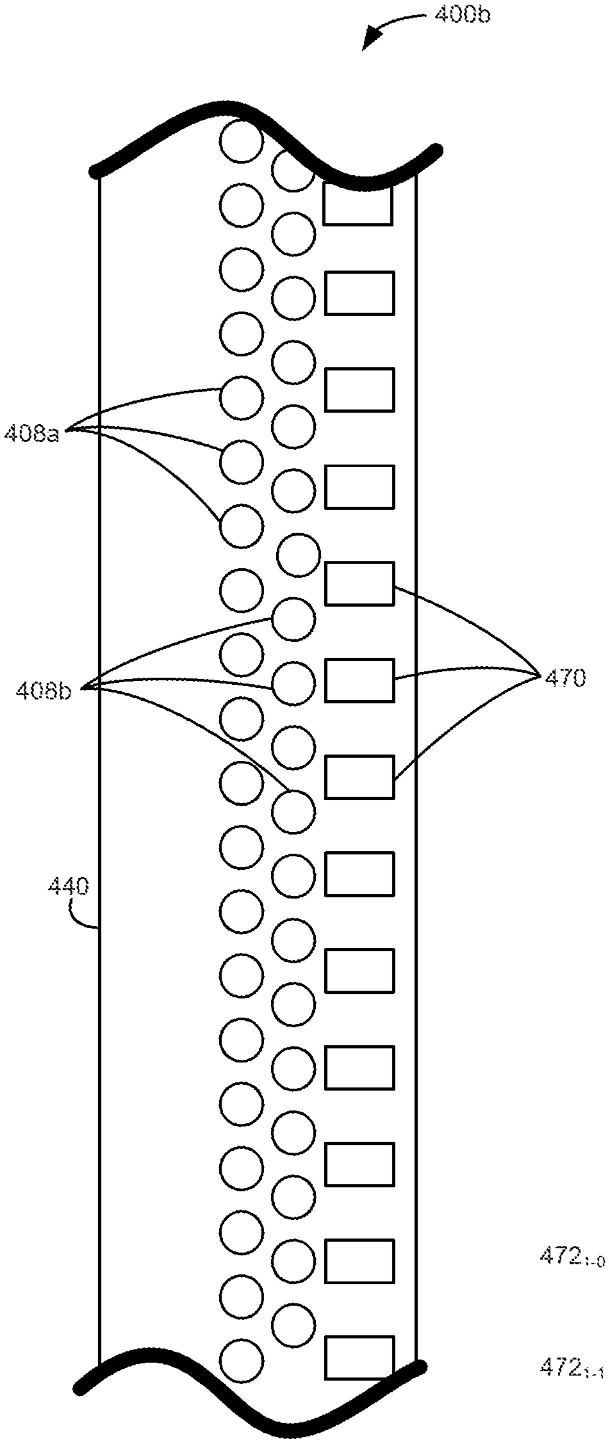
FIG. 6A illustrates an enlarged view of another example of a portion of a fluid ejection die.

FIG. 6A illustrates an enlarged view of a central portion of a fluid ejection die 400*b*, as a further example of the fluid ejection die 400 of FIGS. 4A and 4B. Fluid ejection die 400*b* includes a plurality of nozzles 408*a* arranged in a first column along the length of the elongate substrate 440 and a plurality of nozzles 408*b* arranged in a second column along the length of the elongate substrate 440. The first column is adjacent to the second column. The nozzles 408*a* in the first column may be offset with respect to the nozzles 408*b* in the second column. In addition, fluid ejection die 400*b* includes a plurality of memory cells arranged in groups 470 adjacent to the plurality of nozzles 408*a* and 408*b*. The groups 470 are spaced apart from each other along the length of the elongate substrate 440.

Figure 6B:
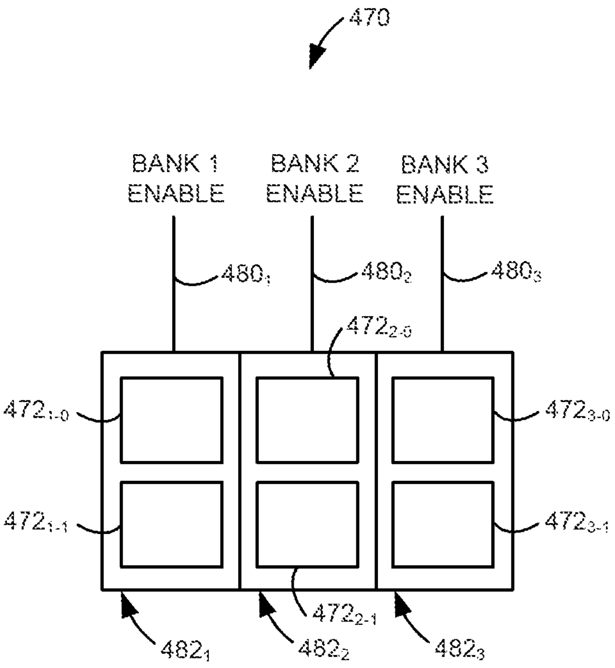
FIG. 6B is a block diagram illustrating one example of a group of memory cells of the fluid ejection die of FIG. 6A.

As illustrated in FIG. 6B, each group 470 may include six memory cells arranged in three banks $\mathbf{482}_1$ to $\mathbf{482}_3$. The first bank $\mathbf{482}_1$ includes a first memory cell $\mathbf{472}_{1\text{-}0}$ and a second memory cell $\mathbf{472}_{1\text{-}1}$. The second bank $\mathbf{482}_2$ includes a first memory cell $\mathbf{472}_{2\text{-}0}$ and a second memory cell $\mathbf{472}_{2\text{-}1}$. The third bank $\mathbf{482}_3$ includes a first memory cell $\mathbf{472}_{3\text{-}0}$ and a second memory cell $\mathbf{472}_{3\text{-}1}$. Each bank $\mathbf{482}_1$ to $\mathbf{482}_3$ may be selected in response to a bank enable signal on a bank enable signal path $\mathbf{480}_1$ to $\mathbf{480}_3$, respectively.

In one example, the plurality of memory cells includes three memory cells 472 corresponding to each nozzle 408*a* and/or 408*b*. A first memory cell (e.g., memory cell $\mathbf{472}_{1\text{-}0}$) corresponding to each nozzle is arranged in a first bank (e.g., bank $\mathbf{482}_1$) of memory cells, a second memory cell (e.g., memory cell $\mathbf{472}_{2\text{-}0}$) corresponding to each nozzle is arranged in a second bank (e.g., bank $\mathbf{482}_2$) of memory cells, and a third memory cell (e.g., memory cell $\mathbf{472}_{3\text{-}0}$) corresponding to each nozzle is arranged in a third bank (e.g., bank $\mathbf{482}_3$) of memory cells. The fluid actuation logic either ejects fluid from the selected nozzles 408*a* and/or 408*b* or accesses memory cells 472 corresponding to the selected nozzles and a selected bank of memory cells.

In one example, the bank one, bank two, and bank three enable signals are based on data stored in a configuration register, such as configuration register 136 of FIG. 1B. In another example, the bank one, bank two, and bank three enable signals are based on data received by fluid ejection die 400*b* along with the address and nozzle data, which is used by configuration logic, such as configuration logic 110 of FIG. 1A, to enable a selected bank $\mathbf{482}_1$ to $\mathbf{482}_3$.

Figure 7:
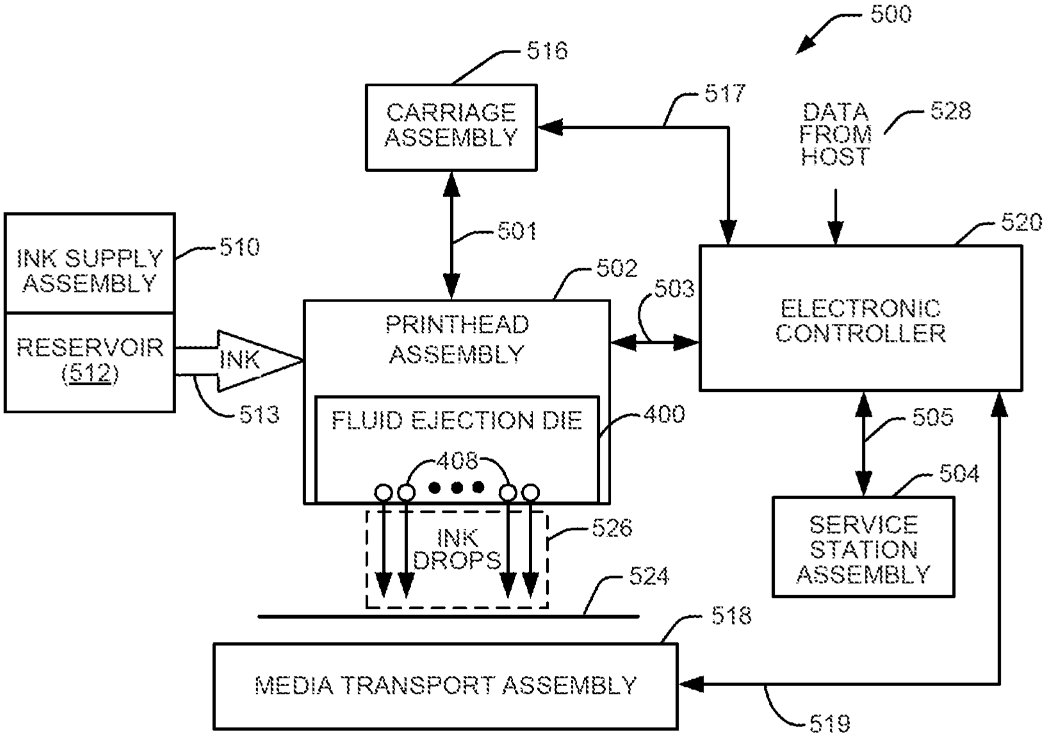
FIG. 7 is a block diagram illustrating one example of a fluid ejection system.

FIG. 7 is a block diagram illustrating one example of a fluid ejection system 500. Fluid ejection system 500 includes a fluid ejection assembly, such as printhead assembly 502, and a fluid supply assembly, such as ink supply assembly 510. In the illustrated example, fluid ejection system 500 also includes a service station assembly 504, a carriage assembly 516, a print media transport assembly 518, and an electronic controller 520. While the following description provides examples of systems and assemblies for fluid handling with regard to ink, the disclosed systems and assemblies are also applicable to the handling of fluids other than ink.

Printhead assembly 502 includes at least one printhead or fluid ejection die 400 previously described and illustrated with reference to FIGS. 4A and 4B, which ejects drops of ink or fluid through a plurality of orifices or nozzles 408. In one example, the drops are directed toward a medium, such as print media 524, so as to print onto print media 524. In one example, print media 524 includes any type of suitable sheet material, such as paper, card stock, transparencies, Mylar, fabric, and the like. In another example, print media 524 includes media for three-dimensional (3D) printing, such as a powder bed, or media for bioprinting and/or drug discovery testing, such as a reservoir or container. In one example, nozzles 408 are arranged in at least one column or array such that properly sequenced ejection of ink from nozzles 408 causes characters, symbols, and/or other graphics or images to be printed upon print media 524 as printhead assembly 502 and print media 524 are moved relative to each other.

Ink supply assembly 510 supplies ink to printhead assembly 502 and includes a reservoir 512 for storing ink. As such, in one example, ink flows from reservoir 512 to printhead assembly 502. In one example, printhead assembly 502 and ink supply assembly 510 are housed together in an inkjet or fluid-jet print cartridge or pen. In another example, ink supply assembly 510 is separate from printhead assembly 502 and supplies ink to printhead assembly 502 through an interface connection 513, such as a supply tube and/or valve.

Carriage assembly 516 positions printhead assembly 502 relative to print media transport assembly 518, and print media transport assembly 518 positions print media 524 relative to printhead assembly 502. Thus, a print zone 526 is defined adjacent to nozzles 408 in an area between printhead assembly 502 and print media 524. In one example, printhead assembly 502 is a scanning type printhead assembly such that carriage assembly 516 moves printhead assembly 502 relative to print media transport assembly 518. In another example, printhead assembly 502 is a non-scanning type printhead assembly such that carriage assembly 516 fixes printhead assembly 502 at a prescribed position relative to print media transport assembly 518.

Service station assembly 504 provides for spitting, wiping, capping, and/or priming of printhead assembly 502 to maintain the functionality of printhead assembly 502 and, more specifically, nozzles 408. For example, service station assembly 504 may include a rubber blade or wiper which is periodically passed over printhead assembly 502 to wipe and clean nozzles 408 of excess ink. In addition, service station assembly 504 may include a cap that covers printhead assembly 502 to protect nozzles 408 from drying out during periods of non-use. In addition, service station assembly 504 may include a spittoon into which printhead assembly 502 ejects ink during spits to ensure that reservoir 512 maintains an appropriate level of pressure and fluidity, and to ensure that nozzles 408 do not clog or weep. Functions of service station assembly 504 may include relative motion between service station assembly 504 and printhead assembly 502.

Electronic controller 520 communicates with printhead assembly 502 through a communication path 503, service station assembly 504 through a communication path 505, carriage assembly 516 through a communication path 517, and print media transport assembly 518 through a communication path 519. In one example, when printhead assembly 502 is mounted in carriage assembly 516, electronic controller 520 and printhead assembly 502 may communicate via carriage assembly 516 through a communication path 501. Electronic controller 520 may also communicate with ink supply assembly 510 such that, in one implementation, a new (or used) ink supply may be detected.

Electronic controller 520 receives data 528 from a host system, such as a computer, and may include memory for temporarily storing data 528. Data 528 may be sent to fluid ejection system 500 along an electronic, infrared, optical or other information transfer path. Data 528 represent, for example, a document and/or file to be printed. As such, data 528 form a print job for fluid ejection system 500 and includes at least one print job command and/or command parameter.

In one example, electronic controller 520 provides control of printhead assembly 502 including timing control for ejection of ink drops from nozzles 408. As such, electronic controller 520 defines a pattern of ejected ink drops which form characters, symbols, and/or other graphics or images on print media 524. Timing control and, therefore, the pattern of ejected ink drops, is determined by the print job commands and/or command parameters. In one example, logic and drive circuitry forming a portion of electronic controller 520 is located on printhead assembly 502. In another example, logic and drive circuitry forming a portion of electronic controller 520 is located off printhead assembly 502.

Although specific examples have been illustrated and described herein, a variety of alternate and/or equivalent implementations may be substituted for the specific examples shown and described without departing from the scope of the present disclosure. This application is intended to cover any adaptations or variations of the specific examples discussed herein. Therefore, it is intended that this disclosure be limited only by the claims and the equivalents thereof.

What is claimed:

1. An integrated circuit to access a memory associated with a fluid ejection device, the integrated circuit comprising:
- a plurality of memory cells;
- an address decoder to select memory cells based on a data signal;
- activation logic to activate selected memory cells based on the data signal and a fire signal; and
- configuration logic to enable or disable access to the plurality of memory cells.

2. The integrated circuit of claim 1, wherein the configuration logic comprises a configuration register storing data to enable or disable access to the plurality of memory cells, and wherein the configuration register stores data to enable write access or read access to the plurality of memory cells.

3. The integrated circuit of claim 2, wherein the data stored by the configuration register includes a memory enable bit received with the data signal to enable the write access or read access to the plurality of memory cells.

4. The integrated circuit of claim 1, further comprising:
- a single interface coupled to each of the plurality of memory cells, the single interface to connect to a single contact of a host print apparatus.

5. The integrated circuit of claim 4, further comprising:
- a write circuit coupled to the single interface, the write circuit to write data to the memory cells.

6. The integrated circuit of claim 4, wherein the single interface comprises a single contact pad.

7. The integrated circuit of claim 1, wherein each memory cell comprises a non-volatile memory cell.

8. The integrated circuit of claim 1, wherein the data signal includes an address and data indicating which memory address for the provided address is to be selected, and wherein the address decoder selects the memory cells in response to the address.

9. The integrated circuit of claim 1, wherein the fire signal indicates when the selected memory cells are to be accessed.

10. The integrated circuit of claim 1, further comprising:
- a data interface to receive the data signal; and
- a fire interface to receive the fire signal.

11. An integrated circuit to access a memory associated with a fluid ejection device, the integrated circuit comprising:
- a plurality of memory cells;
- a select circuit to select memory cells;
- activation logic to activate selected memory cells based on a data signal and a fire signal; and
- configuration logic to enable or disable access to the plurality of memory cells.

12. The integrated circuit of claim 11, wherein the select circuit comprises an address decoder to select the memory cells based on the data signal.

13. The integrated circuit of claim 11, wherein the data signal includes an address and data indicating which memory address for the provided address is to be selected, and wherein the address decoder selects the memory cells in response to the address.

14. The integrated circuit of claim 11, wherein the select circuit comprises the activation logic.

15. The integrated circuit of claim 11, wherein the configuration logic comprises a configuration register storing data to enable or disable access to the plurality of memory cells, and wherein the configuration register stores data to enable write access or read access to the plurality of memory cells.

16. The integrated circuit of claim 11, further comprising:

a single interface coupled to each of the plurality of memory cells, the single interface to connect to a single contact of a host print apparatus.

17. The integrated circuit of claim 16, further comprising:

a write circuit coupled to the single interface, the write circuit to write data to the memory cells.

18. The integrated circuit of claim 16, wherein the single interface comprises a single contact pad.

19. The integrated circuit of claim 11, wherein each memory cell comprises a non-volatile memory cell.

20. The integrated circuit of claim 11, further comprising:

a data interface to receive the data signal; and a fire interface to receive the fire signal.

* * * * *